March 22, 1927.

J. C. MIRE 1,622,161

PNEUMATIC TIRE ARMOR

Filed July 30, 1926    2 Sheets-Sheet 1

WITNESSES

INVENTOR
J. C. Mire
BY
ATTORNEYS

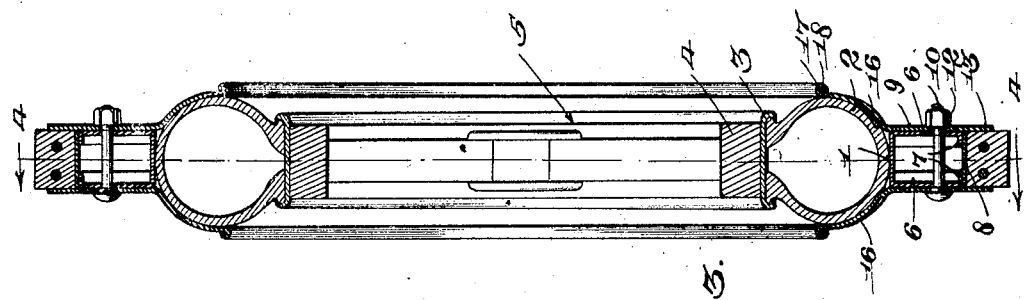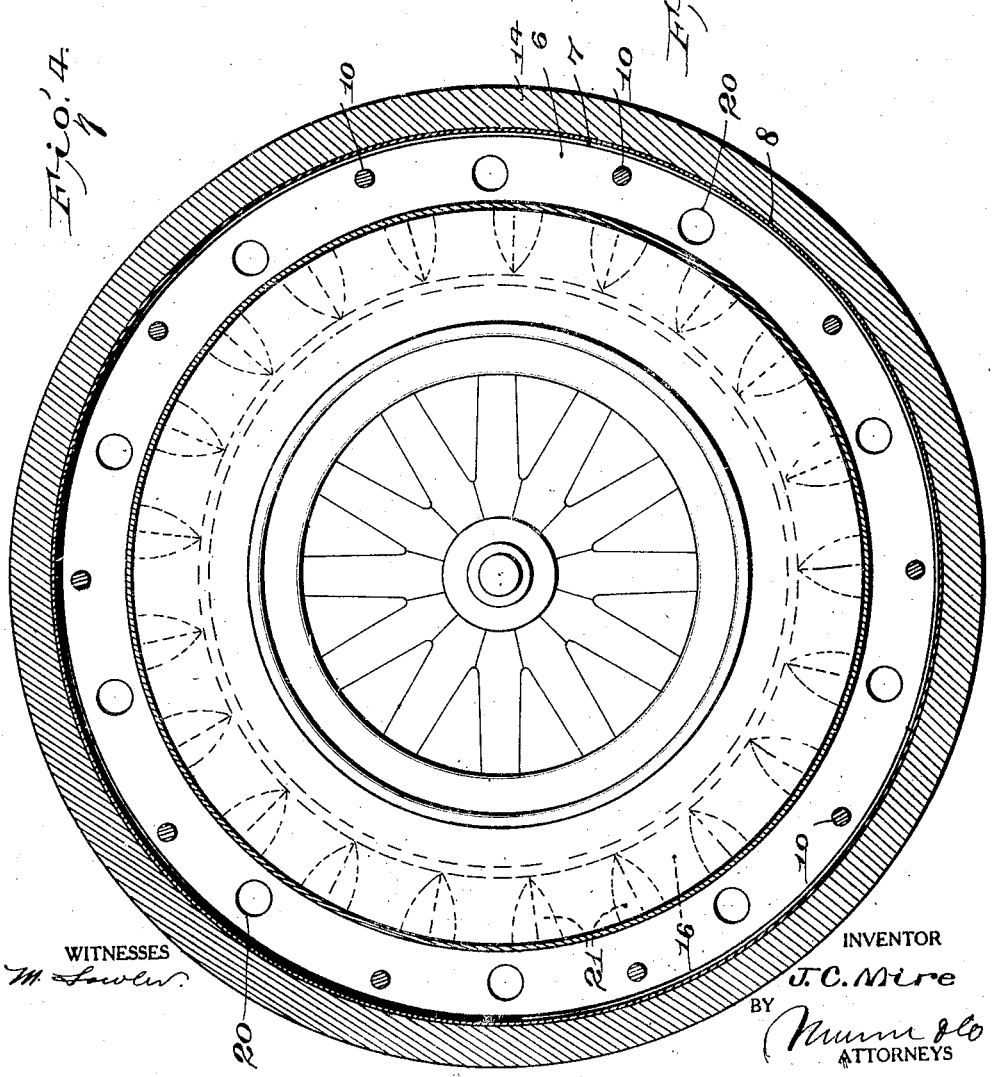

Patented Mar. 22, 1927.

1,622,161

UNITED STATES PATENT OFFICE.

JOSEPH CLEMENT MIRE, OF BATON ROUGE, LOUISIANA.

PNEUMATIC-TIRE ARMOR.

Application filed July 30, 1926. Serial No. 125,992.

My invention relates to improvements in armors for pneumatic tires, and it consists in the combinations, constructions and arrangements herein described and claimed.

An object of the invention is the provision of an armor which affords facilities for protecting the tread portion of a pneumatic tire against puncture or injury without appreciably lessening the resilient action of the pneumatic tire.

A further object of the invention is the provision of a pneumatic tire armor of the character described which can be placed on or removed from a pneumatic tire quickly and easily without any changes in the pneumatic tire or the mounting for the pneumatic tire.

A still further object of the invention is the provision of a pneumatic tire armor of the character described which is strong and durable, not likely to get out of order easily or to injure the associated pneumatic tire, simple in construction and thoroughly practical commercially.

Other objects and advantages of the invention will be apparent from the following description, considered in conjunction with the accompanying drawings, in which—

Figure 1:
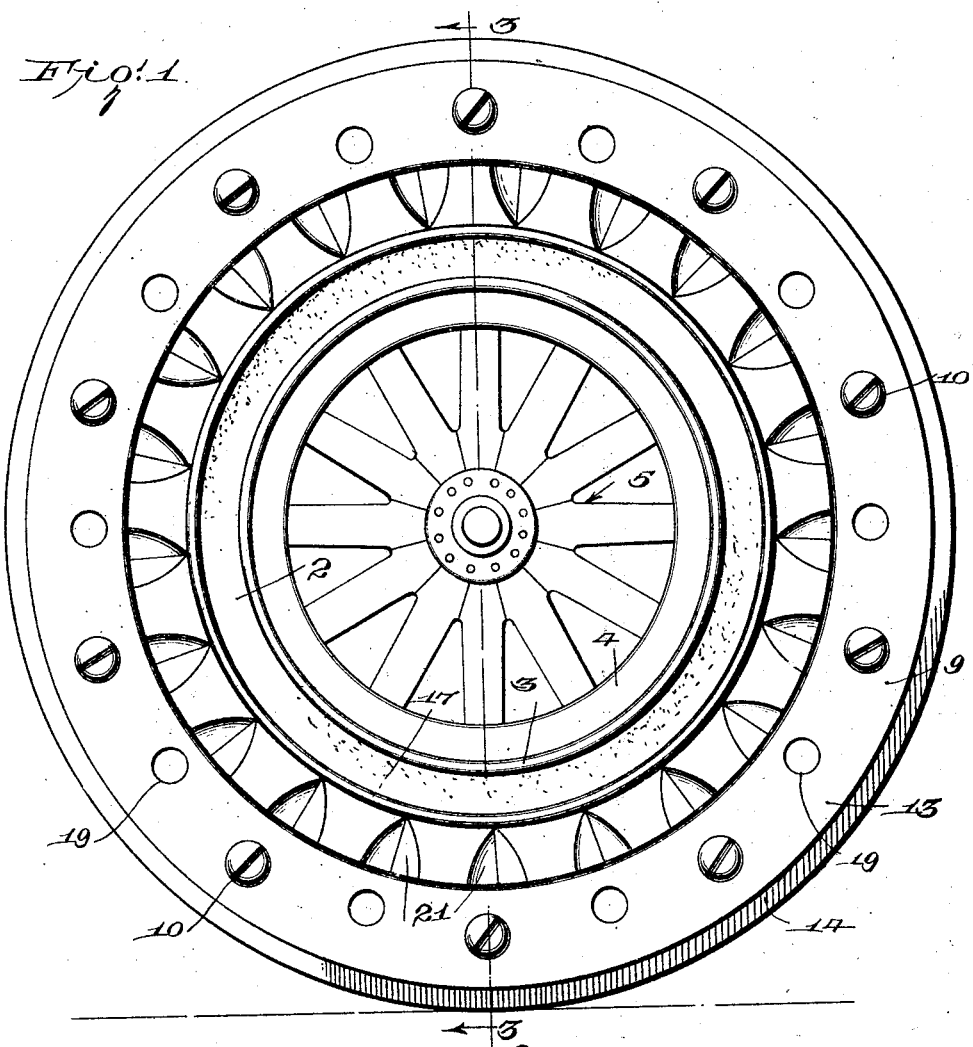
Figure 2:
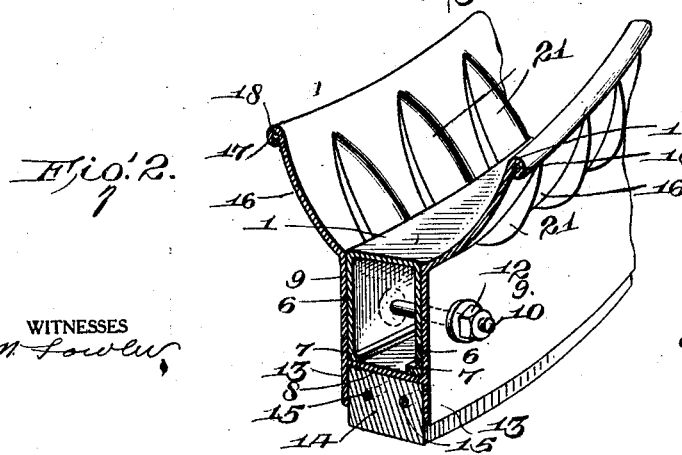

Figure 1 is a side elevation of an armor embodying the invention in place on the pneumatic tire of a vehicle wheel, Figure 2 is a fragmentary perspective sectional view of a portion of the improved armor, Figure 3 is a section substantially along the line 3—3 of Figure 1, and Figure 4 is a section substantially along the line 4—4 of Figure 3.

The improved armor comprises an annular supporting member which includes an inner supporting ring 1 that is adapted to fit snugly on the periphery of a pneumatic tire 2 when the pneumatic tire is inflated as shown to advantage in Figure 3. The pneumatic tire 2 may be supported by a rim 3 of ordinary construction on the felly 4 of a wheel 5.

The aforesaid inner supporting member of the armor is substantially channel-shaped in cross sectional configuration and includes a pair of outwardly extending annular spacing flanges 6 at the edges of the ring 1. These flanges 6 have the outer edge portions thereof turned laterally inward or toward each other as indicated at 7.

The armor also includes an outer supporting ring 8 which is concentric with the inner supporting ring 1 and is supported on the outer edges of the flanges 6 and on the inturned edge portions 7 of the flanges 6, the edges of the ring 8 being substantially flush with the outer faces of the flanges 6.

The ring 8 is secured to the flanges 6 by welding or in any other suitable known manner and the flanges 6 may be formed separately from the ring 1 and secured to the ring 1 by welding if desired.

A pair of annular retaining side plates 9 of disk-like form straddle the flanges 6 and are connected with each other and with the inner supporting member of the armor by means of bolts 10 which extend through aligned transverse openings in the plates 9 and the flanges 6. The bolts 10 are in threaded engagement with nuts 12 which can be tightened on the bolts to cooperate with the bolts to clamp the plates 9 tightly against the flanges 6 and against the edges of the outer supporting ring 8. The outer edge portions of the plates 9 extend beyond the outer peripheral face of the outer supporting ring 8 as indicated at 13 and constitute retaining outer edge portions or flanges for retaining a solid tire 14 in place therebetween and on the outer supporting ring 8. The solid tire 14 may be made of any suitable material, such as a rubber composition or mixture of rubber and fabric and may have any desirable thickness. This solid tire 14 may be reinforced by wires 15 which are imbedded in the tire 14, and extend circumferentially of the tire 14 between the extending outer edge portions 13 of the plates 9.

The plates 9 have integral retaining flanges 16 of relatively great width at their inner edges. The flanges 16 flare laterally outward or away from each other from their junctures with the plates 9 to the inner edges of the flanges 16 and each flange 16 is substantially concavo-convex in cross sectional configuration with the convexly curved face thereof turned outward.

The flanges 16 are formed with outwardly pressed portions or corrugations 21 which extend from the inner edges of the flanges 16 toward the outer edges of the flanges 16. The corrugations 21 are formed to produce recesses in the inner faces of the flanges 16 and said recesses preferably decrease in width and in depth from their inner ends toward the outer edges of the flanges 16 and are adapted to partially receive and to engage with the usual transverse gripping lugs on the tread surface of the tire 2 so that circumferential slipping of the armor on the tire 2 in service will be positively prevented.

The inner supporting ring 1 fits snugly between the plates 9 and the lines of juncture of the plates 9 with the flanges 16 and the rings 1 and the flanges 16 thus conjointly form an annular socket or seat for the reception of the approximately outer half portion of the pneumatic tire 2. The inner edge portions of the flanges 16 may be reinforced by forming the flanges 16 with rolled or beaded inner edge portions 17 in which circumferentially extending reinforcing wires 18 are imbedded.

From the foregoing description of the various parts of the device, the operation thereof may be readily understood. The armor is applied to a pneumatic tire when the tire is deflated and the approximately outer half or tread portion of the tire will be disposed between the flanges 16 within the inner supporting ring 1 of the armor. When the tire is inflated, it will be expanded against the flanges 16 and against the supporting ring 1 of the armor. The friction between the pneumatic tire casing and the walls of the flanges 16 and the supporting ring 1 of the armor and the engagement of the outwardly pressed or corrugated portions 21 of the flanges 16 with the gripping lugs on the tire casing will prevent circumferential slipping of the armor on the tire casing and will assure the retention of the armor firmly in place on the pneumatic tire casing. The pneumatic tire thus will be well protected against puncture and against accidental injury and the wheel will still be resiliently supported in substantially the same manner as though the armor were omitted. The plates 9 of the armor may be provided at intervals with openings 19 and the flanges 6 may have openings 20 in alignment with the openings 19, thus permitting ventilation of the space within the armor outwardly of the supporting ring 1 and between the flanges 6. The solid tire 14 may be replaced when required at a relatively slight cost.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. An armor for pneumatic tires comprising an inner supporting member including a ring adapted to fit on the periphery of a pneumatic tire and a pair of substantially parallel flanges extending radially outward from the edges of said ring, a pair of plates of disk formation straddling said flanges and having oppositely flaring flanges at their inner edges adapted to embrace the approximately outer half portion of a pneumatic tire, fastening devices securing said plates to said flanges and connecting said plates each with the other, the outer edge portions of said plates extending beyond the outer edges of said first named flanges, an outer supporting ring concentric with said first named supporting ring and disposed between the outer edge portions of said plates, said outer supporting ring being supported on the outer edges of said first named flanges, and a solid tire fitting on said outer supporting ring between the outer edge portions of said plates and extending outwardly beyond the outer edges of said plates, said side plates and said first named flanges having aligned ventilating openings.

2. An armor for pneumatic tires comprising an inner supporting ring adapted to fit on the periphery of a pneumatic tire, a pair of side plates clamped against the edges of said supporting ring and having a pair of oppositely flaring flanges at their inner edges adapted to embrace the tread portion of a pneumatic tire, and means received between said side plates for supporting an additional tire between the outer edge portions of said plates, said flaring flanges having depressions in their inner faces for partially receiving and engaging with raised portions of the tread of said pneumatic tire.

3. An armor for pneumatic tires comprising an inner supporting ring adapted to fit on the periphery of a pneumatic tire, a pair of side plates clamped against the edges of said supporting ring and having a pair of oppositely flaring flanges at their inner edges adapted to embrace the tread portion of a pneumatic tire, and means received between said side plates for supporting an additional tire between the outer edge portions of said plates, said flaring flanges having depressions in their inner faces for partially receiving and engaging with raised portions of the tread of said pneumatic tire, said depressions extending from the inner edges of said flaring flanges toward the outer edges of said flanges, said depressions decreasing in width and depth from their inner ends toward their outer ends.

4. An armor for pneumatic tires comprising an inner supporting ring adapted to fit on the periphery of a pneumatic tire, a pair of side plates clamped against the edges of said supporting ring and having a pair of oppositely flaring flanges at their inner edges adapted to embrace the tread portion of a pneumatic tire, and means received between said side plates for supporting an additional tire between the outer edge portions of said plates, said flanges at the inner edges of said plates being concavo-convex in cross sectional configuration with the convexly curved faces thereof turned outward, said flanges having corrugated portions for engaging with the usual lugs or protuberances on the tread of said pneumatic tire.

5. An armor for pneumatic tires comprising an inner supporting ring adapted to fit on the periphery of a pneumatic tire, a pair of side plates clamped against the edges of said supporting ring and having a pair of oppositely flaring flanges at their inner edges adapted to embrace the tread portion of a pneumatic tire, and means received between said side plates for supporting an additional tire between the outer edge portions of said plates, said flanges at the inner edges of said plates being concavo-convex in cross sectional configuration with the convexly curved faces thereof turned outward, said flanges having corrugated portions for engaging with the usual lugs or protuberances on the tread of said pneumatic tire, said corrugated portions extending from the inner edges of said flanges toward the outer edges of the flanges and serving to produce depressions in the inner faces of said flanges, said depressions being adapted to partially receive and to engage with the usual lugs on the tread of the tire.

JOSEPH CLEMENT MIRE.